United States Patent [19]

Rogers

[11] Patent Number: 4,783,292
[45] Date of Patent: Nov. 8, 1988

[54] METHOD OF INJECTION MOLDING A FOAMED PLASTIC ARTICLE USING A RELATIVELY LIGHT GAS AS A BLOWING AGENT

[76] Inventor: Roy K. Rogers, 26575 Barns, Roseville, Mich. 48066

[21] Appl. No.: 61,982

[22] Filed: Jun. 15, 1987

[51] Int. Cl.⁴ .................. C08J 9/30; B29C 45/56; B29C 45/78; B29C 45/80
[52] U.S. Cl. .................. 264/40.6; 264/50; 264/328.7; 264/DIG. 5; 264/DIG. 13; 264/DIG. 83; 425/4 R; 425/144; 425/149
[58] Field of Search .................. 264/50, 45.5, 40.6, 264/328.7, DIG. 5, DIG. 13, DIG. 83; 425/4 R, 144, 149

[56] References Cited
U.S. PATENT DOCUMENTS 4,092,385  5/1978  Balevski et al. .................. 264/45.5
4,096,218  6/1978  Yasuike et al. .................. 264/45.5
4,129,635  12/1978  Yasuike et al. .................. 264/45.5

*Primary Examiner*—Philip Anderson
*Attorney, Agent, or Firm*—Peter A. Taucher; David L. Kuhn

[57] ABSTRACT

A method of forming a foamed plastic article, comprising the steps of: injecting pressurized gaseous bubbles into a stream of heated liquid plastic; feeding the heated liquid, with entrained gas bubbles, into a mold cavity without expanding the bubbles; slowly expanding the mold cavity to permit the gas bubbles to expand and thereby produce a foamed plastic article; controlling the temperature of the mold cavity surfaces so that the plastic material is in a viscous liquid state during at least the major part of the bubble expansion process; and cooling the mold cavity surfaces to a temperature less than the melt point of the plastic.

12 Claims, 1 Drawing Sheet

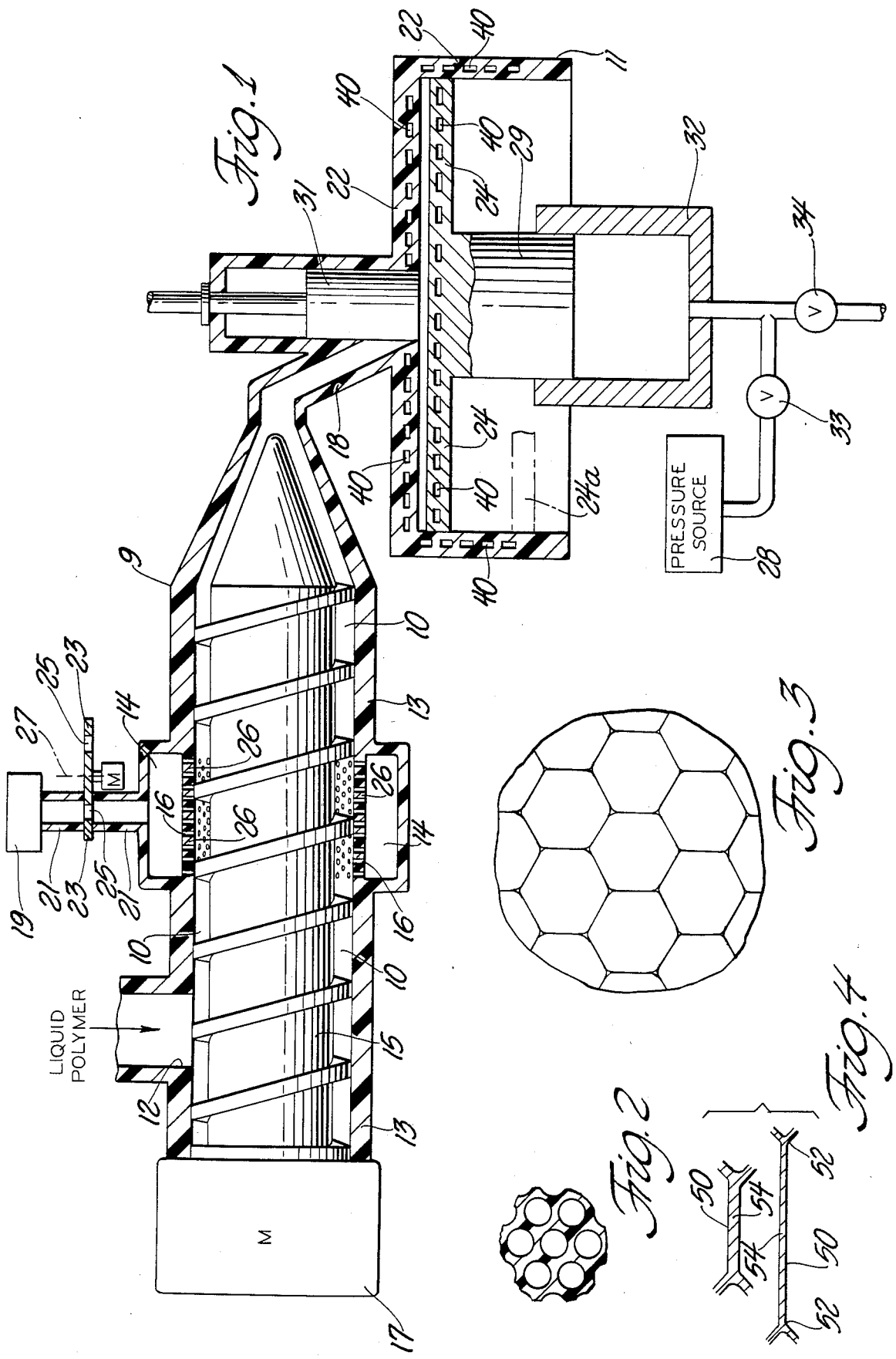

METHOD OF INJECTION MOLDING A FOAMED PLASTIC ARTICLE USING A RELATIVELY LIGHT GAS AS A BLOWING AGENT

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a low density plastic foam product especially useful where low weight (or buoyancy) is a major consideration, e.g., as reinforcement fillers in aircraft, in marine flotation devices, in the walls of freight containers (to reduce shipping costs), or in insulated clothing or bedding.

Heretofore, the minimum density attainable for low density foam products has apparently been approximately 1 lb. per ft$^3$. I envision a product having a substantially lower density, possibly even less than air could be produced it would probably have usage in aircraft or other systems where buoyance (lift) is a necessity.

The gas used to produce foam under conventional practice (blowing agent) is $CO_2$ or other gas that is heavier than air. Therefore, using conventional procedures, it is impossible to produce a foam product with a density less than that of air. I propose to use a gaseous blowing agent having a density less than that of air, and to perform the blowing operation so that the polymer is greatly expanded to a much thinner cell wall thickness than is possible with conventional procedures. An aim of the invention is to produce a foam product having an overall density at or below that of air.

Following are some low weight gases that I contemplate using as blowing agents:

| gas | density lb/ft$^3$ | density$^{relative\ to\ air}$ |
|---|---|---|
| air | .075 (for comparison) | |
| helium | .01 | .138 |
| hydrogen | .005 | .07 |
| ammonia | .04 | .06 |
| methane | .04 | .06 |

Conventional plastics (polymers) have densities that are in the range of 76–75 pounds per ft$^3$. Foam product cell walls formed of polymeric materials must be exceedingly thin if the foam product is to have an overall density less than that of air. Even though the gas in the cells is lighter than air the overall density of the foam product will be above that of air if the cell walls are of usual thickness (i.e., the thickness obtained using conventional foaming methods). Some new process must be devised if the overall density of the foam product is to be less than that of air.

Assume that helium is used as the blowing agent, and that a polymer having a density of 65 lbs/ft$^3$ is used to form the cell walls. To obtain an overall density less than 0.075 (density of air) the polymer weight in 1 ft$^3$ of material must be less than 0.065 lb. (0.075–0.01 density of He). With a polymer density of 65 lbs/ft$^3$, the polymer must have a volume no greater than 0.001 ft$^3$ (for each ft$^3$ of foam product). In other words the polymer volume can be no more than about 1/10 of 1% of the foam product volume. To obtain such a low volume percentage of polymer the polymer material forming the cell walls must be exceedingly thin. Also, the cells must be predominately closed cells (not open cells); otherwise the helium will escape from the cells, thereby undesirably raising the foam product density.

I propose a method of manufacture wherein the blowing agent (e.g., helium) is introduced to a liquid polymer in a pressurized condition. The polymer, with entrained pressurized helium bubbles therein, is pumped into a mold cavity at relatively high pressure. The polymer is then cooled while the cavity is slowly expanded. The polymer is maintained in a liquid, semi-viscous state while the cavity is being expanded.

As the mold cavity is being expanded the pressurized helium bubbles increase in size, to thereby expand the polymer cell walls. The cell walls become progressively thinner as the bubbles expand (i.e., as the mold cavity is slowly opened). During the process the polymer must be maintained in a semi-liquid viscous state (to prevent cell wall rupture). The polymer viscosity can be controlled by controlling the mold cavity cooling rate in relation to the mold cavity pressure.

Hopefully, the proposed method will produce a foam product having a very low overall density (thin cell walls and closed cell character).

THE DRAWINGS

FIG. 1 is a schematic view of an apparatus that can be used to practice my invention.

FIGS. 2 and 3 are idealized views of a foam article, taken at two different stages in a foam-expansion process.

FIG. 4 illustrates cell walls in different stages of cell expansion.

Referring in greater detail to FIG. 1, there is shown an apparatus that can be used to form a plastic foam article. The apparatus comprises two cooperating mechanisms, namely a blowing agent injection mechanism 9 and a foam-expansion mechanism 11. Mechanism 9 is operated to inject pressurized gas bubbles into an annular stream of heated liquid polymer; the gas bubbles are preferably hydrogen or helium or other lighter-than-air gas. Mechanism 11 comprises a two-piece mold cavity device that can be cooled to control the temperature of a partially-foamed plastic received from mechanism 9. The mold cavity device can be slowly expanded to permit the pressurized bubbles in the polymer to expand in a controlled fashion.

BLOWING AGENT INJECTION MECHANISM

Mechanism 9 comprises a tubular housing 13 having a port 12 communicating with a liquid polymer source, not shown. An extruder screw 15 is rotatably driven by a motor 17 to move the liquid polymer in a left-to-right direction through an annular passage 10. The liquid polymer is in a heated condition at the time it is pumped through port 12 into annular passage 10. A pump (not shown) maintains the liquid polymer in a pressurized condition while it is in passage 10.

Gaseous blowing agent, at a relatively high pressure, e.g., 700–1200 p.s.i., is delivered from source 19 through pipe 21 to an annular chamber 14 that surrounds passage 10. Preferably some means is provided in pipe 21 to give the gaseous blowing agent a pulse-type flow. The pulse-producing means is shown as a motor-driven plate 23 having a series of flow openings 25 therethrough; plate 23 rotates around motor axis 27 to alternately cut off the gas flow or transmit the gas flow, thereby producing a pulse-type flow of gas into chamber 14. Various different mechanisms could be used to achieve a pulse-type gas flow. As noted previously, the gaseous blowing agent is preferably a lighter-than-air gas, such as hydrogen or helium.

The inner boundary of chamber 14 takes the form of an annular wall 16. Large numbers of small circular openings 26 are formed through wall 16, such that the pressurized gas is discharged from chamber 14 into passage 10 as a large number of discrete gas jets. The gas pressure is higher than the pressure of the liquid polymer, such that the individual gas jets penetrate into the polymer surface, to form discrete gas bubbles. Chamber 10 has a relatively small radial dimension, whereby the liquid polymer is a relatively thin annulus as it passes through the space circumscribed by flow openings 26. The gas bubbles can penetrate into the polymer surface to points near the inner boundary of the polymer stream, thereby achieving a fairly even distribution of the bubbles throughout the liquid polymer mass.

Hot liquid polymer, with entrained pressurized gas bubbles, is discharged from mechanism 9 into a pipe 18 that leads to foam-expansion mechanism 11. FIG. 1 shows one form that the gas-injection mechanism can take. There are other known ways that pressurized gas bubbles can be introduced into a molten polymer.

FOAM-EXPANSION MECHANISM

Mechanism 11 comprises a stationary wall structure 22, and a movable wall structure 24. The two structures cooperatively define an internal mold cavity 20. Movable wall structure 24 includes a piston 29 slidably positioned in a cylinder 32. Wall structure 24 is movable vertically within wall structure 22 to vary the size of mold cavity 20. The piston-cylinder construction 29, 32 controls the rate at which structure 24 moves. Outward (downward) motion of wall structure 24 expands mold cavity 20 to accommodate expansion of the plastic foam therein.

The plastic foam (unexpanded) is introduced to the mold cavity through an opening that is opened or closed by a piston-type valve 31. The foam is introduced with the mold cavity at substantially zero volume, such that the foam undergoes minimal expansion as it is being introduced into the mold cavity.

The mold cavity volumetric displacement is controlled by an external pressure source (hydraulic fluid) 28 that communicates with cylinder 32 via a valve 33. After cylinder 32 has been filled with liquid (to reduce the mold cavity volume down to zero) valve 33 is closed. Piston valve 31 is then moved upwardly to permit the pressurized foam to flow from pipe 18 into the mold cavity.

With piston valve 31 in an open condition (and valve 33 closed) the liquid in cylinder 32 is slowly vented through a vent valve 34 that connects to a sump (not shown). As the liquid is vented from cylinder 32 motor 17 is operated to cause the pressurized foam to flow from pipe 18 into the mold cavity; wall structure 24 moves down to accommodate the inflow of plastic foam.

After structure 24 has moved down to approximately the FIG. 1 position piston valve 31 is moved down to its closed position. Foam expansion takes place with valve 31 in the closed position, as shown in FIG. 1.

Foam expansion preferably takes place with the molten polymer in a viscous condition. The viscosity may be controlled by cooling the mold cavity surfaces. For this purpose coolant passages 40 may be formed in the mold cavity walls. During the foam expansion process coolant is flowed through passages 40 to cool the foam to a viscous condition. The temperature of the coolant may be varied up or down by mixing coolant (water) with a second heated fluid (water) prior to introduction of the coolant into the coolant passages. During or after the final stages of the foam-expansion process the coolant temperature may be lowered to a value less than the melting (fusion) point of the plastic.

Expansion of the plastic foam is achieved by the pressurized gas bubbles entrained in the plastic. Initially the pressurized bubbles are relatively small, as shown for example in FIG. 2. As valve 34 is opened to vent hydraulic fluid from cylinder 32 the pressurized bubbles are allowed to expand toward the condition shown in FIG. 3.

Valve 34 may be cracked open to permit a slow, but steady, release of hydraulic fluid from cylinder 32. Alternately, valve 34 may be opened and closed in a cyclic manner, to permit the foam-expansion process to be carried out in discrete stages. The intent is to provide a resistance to downward movement of wall structure 24, such that the foam-expansion process is carried out slowly, i.e., not a sudden expansion from a very high pressure down to atmospheric pressure.

When wall structure 24 has been moved down to an "expanded" position 24a (FIG. 1) the foam-expansion process may be terminated. At or shortly before this time the temperature of the mold cavity surfaces is lowered to a value less than the melting point of the polymer. Prior to removal of the foamed article from the mold cavity the polymer cell walls are solid (not liquid).

The initial gas pressure (source 19) is selected so that when the foam is fully expanded (with mold cavity wall 24 in position 24a) the cells within the foamed article will be in pressurized conditions. The cell pressure will act as a reinforcement for the foamed article. Removal of the foamed article from the mold cavity requires complete separation of the mold cavity structure 22 and 24.

FEATURES OF THE INVENTION

The primary feature of my invention is the use of a relatively light gas as the blowing agent. Preferably the blowing agent is helium or hydrogen or other gas having a density less than that of air.

Another feature of my invention is the use of a relatively high gas pressure, preferably greater than 600 p.s.i. The use of high gas pressures promotes high (great) expansion of the individual gas bubbles, e.g., greater than fifty times the initial volume.

A further feature of my invention is the use of a mold cavity that can be slowly expanded to permit a slow controlled expansion of the polymer foam. The mold cavity surfaces are cooled so that the polymer cell material is in a viscous liquid state during the expansion process.

The viscous nature of the polymer is considered important in that it enables the cell wall material to maintain a relatively uniform thickness as it becomes longer, i.e., during cell expansion. FIG. 4 illustrates the process. As the cell expands, each membrane 50 lengthens and simultaneously becomes thinner. If the membrane material is solid it can only lengthen and thin-out by reason of its elasticity; areas of the membrane near midpoint 54 are highly stressed. If however the membrane material is a viscous liquid it can flow to accommodate the expansion process. Viscous liquid flow can presumably take place from membrane extremities 52 toward membrane midpoint 54, to maintain at least approximately a uniform membrane wall thickness along the entire membrane length.

The ability of the membrane walls to flow during the cell expansion process is believed to be helpful in achievement of larger final cell size, thinner cell wall thickness, greater uniformity in cell size, greater membrane strength, and lighter polymer mass (per unit foam volume). Hopefully, it will be possible to achieve a light foamed article that has a density less than that of air, or at least an article having a density less than that previously attainable.

In practicing the invention it is believed necessary to open (expand) the mold cavity slowly, in order to maintain a maximum number of cells, and to minimize ruptures of the cell walls. By slowly opening the mold cavity the viscous cell membranes can have sufficient time to flow and thin out as the cell pressures increase. Abrupt step pressure increases should be avoided as much as possible.

It is difficult to know in advance how slowly (or rapidly) the mold cavity should be opened. Depending somewhat on the size of the foamed article, it is believed that the mold-opening time should be at least about 1 minute (not including the time to cool the plastic below its solidification temperature at the end of the foam-expansion process).

I wish it to be understood that I do not desire to be limited to the exact details of construction shown and described for obvious modifications will occur to a person skilled in the art, without departing from the spirit and scope of the appended claims.

I claim:

1. A method of forming a foamed plastic article, comprising the steps of:
   (a) injecting gaseous bubbles at a pressure between 700 psi and 1200 psi into a matrix of heated liquid plastic;
   (b) providing a mold having a variable volume cavity and an expansion wall bounding one side of the the cavity, the wall movable to a first position wherein the cavity has a relatively lower volume, the mold having a compressing means to urge the wall toward the first, lower-volume position;
   (c) introducing the heated liquid plastic with entrained gas bubbles into the variable-volume mold cavity without expanding the bubbles;
   (d) permitting the gaseous bubbles to expand so as to force the moveable wall at a gradual, selected rate to a second, relatively higher volume position in the mold cavity;
   (e) controlling the rate of bubble expansion by gradually reducing the force which the compression means applies to the moveable wall of the mold;
   (f) controlling the temperature of the mold cavity surfaces to maintain the plastic material in a viscous state during at least a major part of the bubble expansion process.

2. A method of forming a foamed plastic article, comprising the steps of:
   (a) injecting gaseous bubbles at a pressure between 700 psi and 1200 psi into a matrix of liquid plastic;
   (b) providing a mold having a variable volume cavity and an expansion wall bounding one side of the the cavity, the wall moveable to a first position wherein the cavity has a zero volume, the mold having a compressing means to urge the wall toward the first, zero-volume position;
   (c) introducing the liquid plastic with entrained gas bubbles into the variable-volume mold cavity without expanding the bubbles, the entry of the heated liquid plastic into the mold cavity urging the wall against the force of the compressing means away from the first, zero-volume position towards a second, limited volume position wherein the heated liquid plastic completely fills the cavity.
   (d) sealing the cavity so that no fluid flows into it or out of it;
   (e) permitting the gaseous bubbles to expand so as to force the moveable wall at gradual, selected rate from its second, limited-volume position in the mold cavity to a third, expanded-volume position in the mold cavity;
   (f) controlling the rate of bubble expansion by gradually reducing the force which the compression means applies to the moveable wall of the mold;
   (g) controlling the temperature of the mold cavity surfaces to maintain the plastic material in a viscous state during at least a major part of the bubble expansion process.

3. The method of claim 2 wherein the gas is injected into the heated liquid plastic so that the gaseous bubbles are evenly distributed throughout the liquid plastic.

4. The method of claim 2 wherein the mold cavity surfaces are cooled to a temperature less than the melt point of the plastic after the foam-expansion step has been substantially completed.

5. A method of forming a foamed plastic article, comprising the steps of:
   (a) forming a stream of heated liquid plastic generally in the shape of a hollow cylinder having an inner diametrical surface and an outer diametrical surface wherein the stream flows along the axis of the cylinder;
   (b) injecting gaseous bubbles at a pressure between 700 psi and 1200 psi radially into the stream of heated liquid plastic so that the bubbles penetrate from one of the diametrical surfaces of the stream to the other diametrical surface of the stream, the bubbles thereby being distributed uniformly in the stream;
   (c) providing a mold having a variable volume cavity, an entry orifice leading to the cavity and an expansion wall bordering the one side of the cavity, the wall moveable to a first position in the cavity wherein the cavity has a zero volume;
   (d) using fluidic pressure to operate a compression means for urging the expansion wall toward its first, zero-volume position;
   (e) introducing the heated liquid plastic through the entry orifice to the variable-volume mold cavity without expanding the bubbles, the entry of the heated liquid plastic into the mold cavity urging the wall against the force of the compression means away from the first, zero-volume position towards a second, limited volume position, the heated liquid completely filling the cavity at all times while entering the cavity;
   (f) closing the entry orifice so that no fluid flows into the cavity or out of the cavity;

(g) permitting the extrained pressurized gaseous bubbles to expand over a period of at least one minute so as to force the moveable wall at a gradual, selected rate from its second, limited-volume position in the mold cavity to a third, expanded-volume position in the mold cavity;

(h) controllingly retarding expansion of the bubbles and the mold cavity by gradually venting the pressure which the compressing means applies to the moveable wall of the mold;

(i) controlling the temperature of the mold cavity surfaces to maintain the plastic material in a viscous state during at least a major part of the bubble expansion process, the mold surface temperatures being controlled by increasing or decreasing the temperature of fluid flowing through passages in the mold;

(j) while the pressure of the gas bubbles is still greater than atmospheric pressure, cooling the mold to a temperature less than the melt point of the plastic material.

6. The method of claim 5 wherein the gaseous bubbles are formed of a gas that is lighter than air.

7. The method of claim 6 wherein the process of expanding the mold cavity is continued after the temperature of the cavity surfaces has been reduced to a value less than the melt point of the plastic.

8. The method of claim 7 wherein the mass and pressure of the blowing agent are selected so that the foamed plastic article has a density of approximately 0.07 pounds per cubic foot.

9. The method of claim 8 wherein the step of expanding the mold cavity is carried out so that the gaseous bubbles are expanded at least fifty times.

10. The method of claim 9 wherein the step of expanding the mold cavity is carried out so that the final plastic volume is no more than 1 percent of the gas volume.

11. The method of claim 5 wherein the gas is helium.

12. The method of claim 5 wherein the gas is hydrogen.

* * * * *